(12) United States Patent
Hardebeck

(10) Patent No.: US 6,228,918 B1
(45) Date of Patent: May 8, 2001

(54) LOW-TEMPERATURE AND LOW PRESSURE UNSATURATED POLYESTER RESIN COMPOSITION

(75) Inventor: Steven P. Hardebeck, Valparaiso, IN (US)

(73) Assignee: Gil Technologies, Collierville, TN (US)

(*) Notice: Subject to any disclaimer, the term of this patent is extended or adjusted under 35 U.S.C. 154(b) by 0 days.

(21) Appl. No.: 09/182,182

(22) Filed: Oct. 30, 1998

Related U.S. Application Data

(60) Provisional application No. 60/063,808, filed on Oct. 31, 1997.

(51) Int. Cl.[7] ............................................ C08K 5/13
(52) U.S. Cl. ................................... 524/353; 524/359
(58) Field of Search .................................. 524/358, 359, 524/353

(56) References Cited

U.S. PATENT DOCUMENTS

| | | |
|---|---|---|
| 3,883,612 | 5/1975 | Pratt et al. . |
| 4,112,018 | * 9/1978 | Traenckner .......................... 260/861 |
| 4,167,613 | * 9/1979 | Kamens ............................... 521/118 |
| 4,391,947 | 7/1983 | Sassano . |
| 5,821,296 | * 10/1998 | Borden ................................. 524/590 |

FOREIGN PATENT DOCUMENTS

| | | |
|---|---|---|
| 0542494 | 5/1993 | (EP) . |
| 0598227 | 5/1994 | (EP) . |
| WO 89/01956 | 3/1989 | (WO) . |

OTHER PUBLICATIONS

Japanese Abstract No. 262475, May 13, 1996 (XP–002095531).
Japanese Abstract No. 97160, Sep. 6, 1993 (XP–002095532).
Japanese Abstract No. 85401, Aug. 22, 1994 (XP–002095533).
Japanese Abstract, Database WPI/Derwent (XP–002095534).
Japanese Abstract, Database WPI/Derwent (XP–002095535).
Japanese Abstract, Database WPI/Derwent (XP–002095536).
Japanese Abstract, Database WPI/Derwent (XP–002095537).

* cited by examiner

*Primary Examiner*—Paul R. Michl
(74) *Attorney, Agent, or Firm*—Venable; Marina V. Schneller

(57) ABSTRACT

The invention relates to a product and process for producing molded unsaturated polyester products. An unsaturated polyester is formulated with two initiators in combination with two reagents which scavenge free radicals; one of the scavengers traps free radicals which occur at low temperatures of 20 to 50° C.; whereas the second scavenger traps free radical which are produced and occur in the compositions at temperatures above those low temperatures. The compositions of the invention eliminate premature gelling and insure shelf life.

10 Claims, No Drawings

LOW-TEMPERATURE AND LOW PRESSURE UNSATURATED POLYESTER RESIN COMPOSITION

This application claims the benefit of Provisional Ser. No. 60/063,808, filed Oct. 31, 1997.

BACKGROUND OF THE INVENTION

This invention relates to an unsaturated polyester resin composition, and particularly to an unsaturated polyester resin composition that is moldable under low pressure and low temperature conditions. These compositions exhibit extended shelf lives, good flowability, excellent handling properties, good curing characteristics and stable material viscosity.

Unsaturated polyester resin compositions are well known for use in sheet molding compounds from which a variety of articles can be molded. The unsaturated polyester resin compositions generally include an unsaturated polyester component, one or more thermoplastic low profile additives, and at least one olefinically unsaturated monomer which copolymerizes with the unsaturated polyester. The resin composition may include an organic peroxide for catalyzing the reaction, a stabilizer and a filler, and generally further includes one or more fibrous reinforcement materials, such as chopped glass or textile fibers. Due to their excellent mechanical strength, heat resistance, water resistance and chemical resistance, fiber-reinforced plastics produced from these unsaturated polyester resin compositions are used in a number of diverse applications, such as molded bathtubs, water tanks, or load-bearing structural elements. In the transportation industry, fiber-reinforced plastics are used to produce oil pans, heat shields, rocker covers, grill opening panels, and exterior body panels, and other components. The degree of smoothness, affinity for paint and quality of other surface characteristics desired generally depends upon the application in which the fiber-reinforced plastics are employed. For example, the quality of the surface characteristics may range from "Class A" typically used for the exterior surfaces of automobiles to surface smoothness acceptable in typical general purpose applications.

There are various methods known in the art for molding fiber-reinforced plastics. Among such methods are open mold techniques and closed mold techniques. Open mold techniques include the hand lay up method and the spray-up method. Open mold techniques are generally used when forming large-sized parts such as boat hulls, van tops, fenders, or similar articles. While open mold techniques allow lower temperatures and pressures, there are many problems associated with the techniques. Additionally, for example, in cold press molding, the molding composition is poured in cold by hand. As the compound cures, the edges must be trimmed around the mold, resulting in wasted raw materials. Further, the molder is exposed to dispersion of styrene and scattered fibers throughout the process and the molded article has a poor surface quality. Other low temperature techniques, such as resin transfer molding, require a long cycle time of at least 15 minutes to one hour in order to form a single part or component.

Closed mold techniques, such as compression molding methods, are generally used to mold articles from unsaturated polyester based sheet molding compounds (SMC) or thick molding compounds (TMC). A hydraulic press provides the high pressure and elevated temperatures required to form the article. Since it is a closed system, closed molding techniques are free of the dispersion and scattering of styrene and fiberglass typically associated with open mold techniques. However, the steel molds required to withstand the high pressures and temperatures are expensive. Therefore, a large capital investment is required for the press and molds.

Accordingly, there is a need for a resin composition which can be molded at low temperatures and pressures in less expensive equipment. There also is a need for a resin composition which produces molded articles having surface characteristics and mechanical properties similar to articles molded with conventional high temperature high pressure techniques. There is a further need for a low temperature low pressure resin composition which significantly reduces the cycle time required to mold an article.

SUMMARY OF THE INVENTION

The resin composition of the present invention addresses these and other needs by providing a sheet molding composition that is curable at low temperatures and has good fluidity and filling properties under low pressure conditions. The resin composition of the present invention has exceptional long-term storage stability at ambient temperature, and molded articles produced from the composition have good mechanical strength, heat resistance, water resistance, chemical resistance and surface properties. The low pressure, low temperature unsaturated polyester resin composition comprises an unsaturated polyester, a low profile thermoplastic polymer, an olefinically unsaturated monomer, at least two organic peroxides, and at least two stabilizers. As used herein "low temperature" means a temperature of less than about 120° C. and the term "low pressure" means a pressure of less than about 500 psi.

The present resin composition is useful in molding large size parts, components for residential appliances and various automotive parts. Furthermore, the resin molding composition has good curability at low temperatures of from about 50° C. to about 120° and superior storage stability at room temperature. The present resin molding composition exhibits excellent handling properties and is not sticky or gummy during use.

The composition of the invention can be used as a sheet molding compound or composition; the acronym SMC is used interchangeably with sheet molding compound herein. An SMC formulation can be molded at a temperature between 65–95° C. and 0.7–3.5 megapascals (Mpa) for 5–20 minutes. Ideally the compound or composition should be molded at 88° C. and 1.4 Mpa for 7 minutes.

DETAILED DESCRIPTION OF THE INVENTION

The unsaturated polyester resin molding composition of the invention comprises an unsaturated polyester, a low profile thermoplastic polymer, an olefinically unsaturated monomer which copolymerizes with the unsaturated polyester, at least two stabilizers, and at least two organic peroxides.

The unsaturated polyester component of the resinous system comprises the polycondensation reaction product of one or more dihydric alcohols and one or more ethylenically unsaturated polycarboxylic acids. The term "polycarboxylic acid" generally means the polycarboxylic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon to carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which include o-phthalic, isophthalic, terephthalic, succinic, adipic, sebacic, methyl-succinic, and the like. Dihydric alcohols that are useful in preparing the polyesters include 1,2-propanediol (hereinafter referred to as propylene glycol), dipropylene glycol diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acid; (4) propylene glycol, maleic and/or fumaric acids and dicyclopentadiene reacted with water. In addition to the above described polyester one may also use dicyclopentadiene modified unsaturated polyester resins as described in the Pratt et al. U.S. Pat. No. 3,883,612, the entire disclosure of which is incorporated herein by reference. These examples are intended to be illustrative of suitable polyesters and are not intended to be all inclusive. The acid number to which the polymerizable unsaturated polyesters are condensed is not particularly critical with respect to the ability of the low-profile resin to be cured to the desired product. Polyesters which have been condensed to acid numbers of less than 100 are generally useful, but acid numbers less than 70 are preferred. The molecular weight of the polymerizable unsaturated polyester may vary over a considerable range, generally those polyesters useful in the practice of the present invention having a molecular weight ranging from 300 to 5,000, and more preferably, from about 500–5,000.

In the present sheet molding resinous system, the unsaturated polyester is generally present in amounts ranging from about 55 to 90 parts per 100 parts by weight. Preferably, the unsaturated polyester in the sheet molding composition comprises from about 60 to about 85 parts per 100 parts by weight and more preferably from about 70 to about 80 parts per 100 parts by weight. As used herein "per 100 parts by weight" represents the sum, by weight, of the unsaturated polyester, vinyl monomer and thermoplastic resin.

The monomer component of the resinous system comprises materials that copolymerize with the unsaturated polyester which typically are ethylenically unsaturated monomers. These monomers may include acrylate, methacrylates, methy methacrylate, 2-ethylhexyl acrylate, styrene, divinyl benzene and substituted styrenes, multifunctional acrylates and methacrylates such as ethylene glycol dimethacrylate or trimethylol propanetriacrylate. The ethylenically unsaturated monomer is usually present in the range of about 5 to 50 parts per 100 parts by weight, preferably 5 to about 40 parts per 100 parts by weight, and more preferably from about 5 to about 30 parts per 100 parts by weight. The vinyl monomer is incorporated into the composition generally as a reactive diluent for the unsaturated polyester and for the thermoplastic resin.

The low profile additives of this invention are typically those known in the art and can include those materials that, when mixed in an unsaturated polyester and cured, result in a multiphase system. A number of thermoplastic polymers are known to reduce shrinkage in unsaturated polyesters. The low profile additive can be present in amounts ranging from about 5 parts to about 50 parts per 100 parts by weight, preferably from about 5 parts to about 40 parts per 100 parts by weight, and more preferably from about 10 to about 30 parts per 100 parts by weight. Examples of suitable low profile additives include saturated polyesters, polystyrene, urethane linked saturated polyesters, polyvinyl acetate, polyvinyl acetate copolymers, acid functional polyvinyl acetate copolymers, acrylate and methacrylate polymers and copolymers, homopolymers and copolymers include block copolymers having styrene, butadiene and saturated butadienes e.g. polystyrene.

In order to produce a satisfactory low temperature, low pressure molding compound, it is critical that at least two organic peroxide initiators be used. It is believed that the first initiator is required to initiate a first reaction which, in turn, is required to activate the second initiator. The combination of initiators insures that the reaction proceeds within a relatively short cycle time while preventing premature curing of the compound. The initiators are preferably selected from organic peroxides which are highly reactive and decomposable at the desired temperature and having the desired rate of curing. Preferably the organic peroxide is selected from those which are decomposable at temperatures from about 50° C. to about 120° C.

The organic peroxides to be used in the practice of the invention can be selected from tertiary butyl peroxy 2-ethylhexanoate; 2,5-dimethyl-2,5-di(-benzoylperoxy) cyclohexane; tertiary-amyl 2-ethylhexanoate and tertiary-butyl isopropyl carbonate; tertiary-hexylperoxy 2-ethylhexanoate; 1,1,3,3-tetramethylbutylperoxy 2-ethylhexanoate; tertiary-hexylperoxypivalate; tertiarybutylperoxy pivalate; 2,5-dimethyl-2,5-di(2-ethylhexanoylperoxy) cyclohexane; dilauroyl peroxide; dibenzoyl peroxide; diisobutyryl peroxide; dialkyl peroxydicarbonates such as diisopropyl peroxydicarbonate, di-n-propyl peroxydicarbonate, di-sec-butyl peroxydicarbonate, dicyclohhexyl peroxydicarbonate; VAZ052 which is 2,2'-azobis(2,4-dimethyl-valeronitrile.) di-4-tertiarybutylcyclohexyl peroxydicarbonate and di-2 ethylhexyl peroxydicarbonate and t-butylperoxy esters, such as tertiary butylperpivalate and teriarybutylper pivalate and eodecanoate. More preferably, the initiators are di-(4-tert-butyl-cyclohexyl) peroxydicarbonate and dibenzoyl peroxide. Most preferably, the dibenzoyl peroxide is used as a solution or a paste; preferably it is not used in dry form. In the examples below, it is used as a 40% solution. These are used in a proportion that totals from about 0.1 parts to about 8 parts per 100 parts by weight, preferably from about 0.1 to about 5 parts per 100 parts by weight, and more preferably from about 0.1 to about 4 parts per 100 parts by weight.

It is also critical to the invention that at least two stabilizers or inhibitors be used in the practice of the invention. It has been found that when one of the stabilizers is omitted, the compound either gels prematurely or is prevented from curing at reduced temperatures. The stabilizers preferably are those having high polymerization inhibiting effect at or in the vicinity of room temperature. The choice of the two stabilizers is critical. One of the stabilizers will scavenge free radicals generated at lower temperatures, of about 25° to roughly 55° C. Preferably, this stabilizer is BHT. The second inhibitor scavenges free radicals generated at higher temperatures, i.e., greater than 40° C.; accordingly, the second free radical inhibitor will scavenge free radicals generated at temperatures above lower temperatures in the range of about 25° to roughly 55° C. The combination of these two different inhibitors appears to be synergistic, as illustrated in the comparative examples 4 and 5. Examples of suitable stabilizers include hydroquinone; toluhydroquinone; di-tertiarybutylhydroxytoluene (BHT); paratertiarybutylcatechol (TBC); mono-tertiarybutylhydroquinone (MTBHQ); hydroquinone monomethyl ether; butylated hydroxyanisole (BHA); hydroquinone; and parabenzoquinone (PBQ). Preferably, the stabilizers are BHT and PBQ. The stabilizers are used in a total amount ranging from about 0.1 to about 4.0 parts per 100 parts, preferably from about 0.1 to about 3.0 parts per 100 parts and more preferably from about 0.1 to about 2 parts by weight per 100 parts by weight of the sum of the unsaturated polyester, the vinyl monomer and thermoplastic resin. In a preferred embodiment, the amount of BHT used, relative to the total amount of stabilizer used, ranges from about 15% to about 85% and desirably from about 25% to about 75%.

The stabilizer combination traps free radicals which would initiate premature polymerization and/or crosslinking. This premature crosslinking leads to gels, higher molecular weight components in the matrix of polyester. The issue of gel pertains to the question of shelf life of the material and the molding process. Under normal conditions the molding composition will have a defined period of time where it is usable (moldable). Outside these normal conditions the molding composition will harden prematurely, or "gel". During the molding process a desirable molding composition is placed into a heated tool and pressed together. The heat from the tool activates the initiator and the resin crosslinks and becomes hard, or "gels".

Typically, reinforcement fibers or fibrous reinforcement is added to the sheet molding composition in an amount of between about 5 parts and about 60 parts per 100 parts by weight of the resin composition, depending upon the desired characteristics of the final molded product. Reinforcement fibers or fibrous reinforcement is taken to mean glass fibers in one form or another, such as glass fabrics, chopped glass strands, chopped or continuous strand glass fiber mat; however, the terms also include reinforcing agents which may also be used if desired, for example, asbestos, cotton, synthetic organic fibers and metals.

Pigments and fillers which are normally added to resin compositions can be used in formulating the sheet molding composition of the present invention. Suitable fillers include calcium carbonate, aluminum hydroxide, talc, silica, clay, glass powders and glass balloons. Fillers can be incorporated in a proportion of from about 0 parts to 200 parts per 100 parts by weight of the sum of the unsaturated polyester, vinyl monomer and thermoplastic resin, depending upon the amount of fibrous reinforcement added to the composition.

The sheet molding composition may further include a thickening agent such as oxides, hydroxides, and alcoholates of magnesium, calcium, aluminum and the like. The thickening agent can be incorporated in a proportion ranging from about 0.05 parts to about 5 parts per 100 parts by weight, preferably from about 0.1 parts to about 4 parts per 100 parts by weight and more preferably, from about 1 part to about 3 parts per 100 parts by weight.

The invention is further illustrated by reference to the following examples. These examples are intended to be illustrative of suitable compatible components and not intended to be all inclusive or limiting of the claimed invention.

It is recognized by those skilled in the art that an acceptable low pressure, low temperature sheet molding compound should have a viscosity that builds to approximately 10 MmcPs [millions centipoise] in less than 3 days and maintains the viscosity at about 10 MmcPs for at least 14 days.

The molded article made from the sheet molding compound should have a Barcol HB hardness measurement of at least 5 HB after being molded for a given period of time. The hardness value should increase to about 20 HB and preferably greater than 20 HB after the molded article has cooled for 5 minutes.

For compression molding compounds, it is preferable to have a minimum of 25 inches of flow to form an acceptable article from the sheet molding compound.

The following materials may be identified below by their tradename with an explanation of the material components in the Examples: E-903-1 0.20 mole dicyclopentadiene/1.00 mole propylene glycol/1.00 mole maleic anhydride VX-2027 0.50 mole neopentyglycol/1.25 mole propylene glycol/1.00 mole maleic anhydride/0.5 mole isophtalic acid E-964 0.50 mole isophthalic acid/1.60 mole propylene glycol/1.00 mole maleic anhydride S-602 modified polyvinylacetate N.V. nonvolatiles MmcPs millions centipoise Various molding processes can be divided into Open Mold and Closed Mold processes. Open Mold includes those processes which require only one mold surface to produce a pare. Examples of Open Molding processes are hand lay-up, spray-up and filament winding. Closed Mold include those processes that use two molt surfaces to produce a part. Examples of Closed Molding processes are RTM (Resin Transfer Molding), Liquid Molding LM), pultrusion and compression molding. Each of these different processes has constraints relative to cost, number of parts produced per year, material performance, process capability, and more increasingly environmental regulations.

For example in compression molding the process constraints typically are defined as high cost steel tooling, high tonnage presses, high temperature, and short circle times. This process produces high quality, consistent parts, with minimal waste. In order to capitalize on these benefits and amortize high equipment costs, the parts per year must be considerably higher than other processes.

In recent years, using low pressure molding compounds has extended the process window of compression molding. Low pressure SMC offers several advantages such as giving the molder the ability to mold larger parts in existing press, increased productivity by using multiple tools in a single press and reduced tooling costs. The last advantage has not yet been realized because in most cases the production volumes are high enough to warrant steel tooling. Reduced mass steel tools and alternate materials are possibilities but are seen as unproven technologies. Finally, the high molding temperatures limit most tooling to either steel or aluminum.

The RTM process uses low cost tooling, low tonnage presses, and low molding temperatures. This process produces good quality parts at the expense of longer cycle times and increased trimming waste. The lower capital investment is attractive for those applications in which a few prototype parts to around ten thousand parts per year are needed.

In the open mold processes the tooling costs are even less expensive. The cycle times are longer and there is a greater dependence on operators to produce consistent parts. There is a significant degree of post mold finishing required and mounting pressure to reduce styrene emissions.

These is an apparent gap between the RTM process and the SMC process. A new method of molding FRP parts is needed to provide consistent quality parts found in the SMC process with the lower cost equipment used in the RTM process. The new process would also have similar properties to conventional SMC with equal or faster cycle times of RTM.

The new process of Low Temperature/Low Pressure Sheet Molding Compound (LT/LP/SMC) will bridge the gap between RTM and SMC. This new LT/LP SMC process uses conventional SMC resins processed on conventional SMC equipment. It can be molded in less than fifteen minutes on epoxy tools heated with hot water. The finished part has similar properties to SMC parts and can be bonded and painted.

Moreover in accordance with the invention LT/LP SMC offers a method in which the prototype can be molded under the conditions described above.

COMPARATIVE EXAMPLE 1

A resin composition was prepared by mixing 44.3 parts per hundred (phr) of an unsaturated polyester resin (DCPD/Man/PG available from AOC under the trade name E-903-1), 21.1 phr of a second unsaturated polyester resin (PG/NPG/ISO/Man available from AOC under the trade name VX-2027), 23.6 phr of a 70%, by weight, polystyrene solution in styrene as a low profile additive (LPA), 11 phr of urethane adipate as a second LPA.

Added to this mixture was 0.05 phr of inhibitor di-tertiary-buthlhydroxytoluene, 2 phr initiator teriary-amyl peroxy-2-ethylhexanoate, 0.5 phr of fluidity modifier fumed silica, 6 phr internal mold release zinc stearate, and 100 phr of filler calcium carbonate (5 micron). The combined mixture was mixed under high shear to form a paste having a temperature of 27° C. To the paste 1.06 phr of a 38%, by weight, predispersed earth oxide thickener paste and 1 inch length glass was mixed under high shear to a temperature of 30° C. This composition was made in to a sheet molding compound containing 27% of fibrous chopped fiberglass having a length of 1 inch. The above SMC was measured for viscosity build using a paste and a Brookfield HBT viscometer with a T-F spindle rotating at 1.0 rpm. The viscosity measurements were taken over a two week interval. Panels of the above formulation were cured for the prescribed time as indicated in Table 1 below. The molding conditions were 88° C. and 500 psi. Thirty-four (34%) of the mold was covered by the SMC. The molded panels were tested for hardness as soon as the press was opened and again after 5 minutes. The hardness reading was obtained using a Barcol HB Impressor per the ASTM D2583-93 test procedure. Mold flow was measured per the ASTM D3123-94 test procedure using a spiral flow press heated to 82.2° C. The results are shown in Table 1.

The results show a low thickened viscosity value after 1 day. The viscosity increased to only 4 MMcPs after 14 days. This same compound, after being molded at 88° C. for ten minutes, had no Barcol HB hardness and had no hardness after it cooled for 5 minutes. The fluidity of the compound was measure by a spiral flow press heated to 82.2° C. and a ram pressure of 300 psi. The composition was not acceptable for use as a low temperature, low pressure unsaturated polyester resin molding compound.

COMPARATIVE EXAMPLE 2

A resin composition was prepared by mixing 75 phr of unsaturated polyester (PG/Man/ISO, available from AOC under trade name E-964), 15 phr of a low profile additive (Modifier PVac available from AOC under trade name S-602) and 10 phr of styrene. Added to this mixture was 0.1 phr of inhibitor di-tertiary-butylhydroxytoluene (BHT), 0.5 phr of a 5%, by weight, inhibitor para-benzoquinone solution, 2 phr of initiator teriary-amyl peroxy-2-ethylhexanoate, 4 phr internal mold release agent zinc stearate, and 120 phr of a filler (5 micron calcium carbonate). The composition was mixed under high shear to a temperature of 27° C. Two (2) phr of magnesium oxide thickener paste was added and mixed to a temperature of 30° C.

This compound had a low 1 day thickened viscosity value. The viscosity continued to increase to 28 MMcPs after 14 days. The Barcol hardness out of the mold was 0 and did not increase after cooling for 5 minutes. The spiral flow of the composition was 44 inches.

This composition was not acceptable as a low temperature, low pressure molding compound.

COMPARATIVE EXAMPLE 3

The resin composition of Comparative Example 2 was prepared except in addition to the 2 phr of initiator teriary-amyl peroxy-2-ethylhexanoate, 1 phr of initiator di(4-tert-butyl cyclohexyl) peroxydicarbonate was used. This composition had a low 1 day thickened viscosity value. The viscosity continued to increase to 42 MMcPs after 14 days. The composition was molded at 88° C. for 10 minutes. The molded part had a hardness value of 10 HB. After cooling for 5 minutes, the molded part had a hardness value of 40 HB. The spiral flow of this composition was 22.7 inches. Due to the viscosity increase this composition was not acceptable as a low temperature low pressure molding compound.

COMPARATIVE EXAMPLE 4

A resin composition was prepared by mixing 75 phr of an unsaturated polyester, phr of a low profile additive (LPA) and 10 phr of styrene. Added to this mixture was 0.5 phr of a 5%, by weight, inhibitor parabenzoquinone solution, 4 phr of a 40%, by weight, emulsion of dibenzoyl peroxide initiator (available from Atochem under the trade name Luperox AFR 400), 1 phr of di(4-tert-butyl-cyclohexyl) peroxydicarbonate, 4 phr of mold release agent zinc stearate, 120 phr of the filler calcium carbonate (5 micron), 2 phr of magnesium oxide thickener paste, and 27% of fibrous chopped glass having a length of one inch.

The composition gelled prematurely after 2 days. This composition was not acceptable as a low temperature, low pressure compound.

COMPARATIVE EXAMPLE 5

A resin composition was prepared by mixing 75 phr of an unsaturated polyester, 15 phr of a LPA and 10 phr of styrene. Added to this mixture was 0.1 phr of inhibitor BHT, 4 phr of a 40%, by weight, emulsion of dibenzoyl peroxide initiator, 1 phr of initiator di(4-tert butyl-cyclohexyl) peroxydicarbonate, 4 phr of zinc stearate, 120 phr of calcium carbonate, 2 phr of magnesium oxide thickener paste, and 27% of fibrous chopped glass having a length of one inch. This compound gelled prematurely after 2 days. This composition was not acceptable as a low temperature, low pressure molding compound.

COMPARATIVE EXAMPLE 6

A resin composition was prepared by mixing 75 phr of unsaturated polyester, 15 phr of LPA and 10 phr of styrene. Added to this mixture was 0.1 phr of inhibitor BHT and 0.5 phr of a 5%, by weight, inhibitor parabenzoquinone solution, 1 phr of di(4-tert-butyl cyclohexyl)

peroxydicarbonate, 1.6 phr of dibenzoyl peroxide (available from Elf Atochem under the trade name Laperox A98), 4 phr of zinc stearate, 120 phr of calcium carbonate, 2 phr of magnesium oxide thickener paste, and 27% of fibrous chopped glass having a length of one inch.

This composition had a low 1 day thicken viscosity value. After 14 days the viscosity increased to 59.8 MMcPs. The composition was molded at 88° C. for 10 minutes. The molded part had a hardness value of 5 HB which increased to 25 HB after cooling. The spiral flow was 16.3 inches. This composition was not acceptable as a low temperature, low pressure molding compound.

COMPARATIVE EXAMPLE 7

A resin composition was prepared by mixing 75 phr of unsaturated polyester, 15 phr of LPA and 10 phr of styrene. To this mixture was added 0.1 phr of BHT, 0.5 phr of a 5%, by weight, initiator parabenzoquinone solution, 4 phr of a 40%, by weight, emulsion of dibenzoyl peroxide initiator, 4 phr of zinc stearate, 120 phr of calcium carbonate, 2 phr of magnesium oxide thickener paste, and 27% of fibrous chopped glass having a length of one inch.

This compound had a 1 day thickened viscosity value of 11.6 MMcPs. The viscosity increased to 12.6 MMcPs after 14 days. The composition was molded for 30 minutes at 88° C. The molded article had a hardness reading of zero and did not increase after cooling. The spiral flow was 44 inches. This composition is not acceptable as a low temperature, low pressure molding composition.

COMPARATIVE EXAMPLE 8

The resin composition of Comparative Example 7 was prepared except 1 phr of di(4 tert-butyl-cyclohexyl) peroxydicarbonate initiator was added in addition to the 4 phr of a 40%, by weight, emulsion of dibenzoyl peroxide initiator. Additionally, 180 phr of filler was added to the composition.

The thickened viscosity after 1 day was 22.6 MMcPs. After 14 days the thickened viscosity was 22.0 MMcPs. The composition was molded at 88° C. for 10 minutes. The hardness was 5 HB and increased to 25 HB after cooling for 5 minutes. The spiral flow was 15.7 inches. This composition is not acceptable as a low temperature, low pressure molding compound.

COMPARATIVE EXAMPLE 9

The resin composition of Comparative Example 8 was prepared except 120 phr of filler and 3.44 phr of magnesium oxide thickener paste was used. This compound had a 1 day thickened viscosity of 38.8 MMcPs. After 14 days the composition had a thickened viscosity greater than 80 MMcPs. The composition was molded at 88° C. for 10 minutes. The molded article had a hardness value of 5 HB which increased to 25 HB after cooling for 5 minutes. The spiral flow was 15.7 inches. This composition was not acceptable as a low temperature, low pressure molding compound.

TABLE 1

| | Comparative Example No. | | | | | | | | |
|---|---|---|---|---|---|---|---|---|---|
| | 1 | 2 | 3 | 4 | 5 | 6 | 7 | 8 | 9 |
| DCPD/Man/PGE (70% N.V.) | 44.3 | — | — | — | — | — | — | — | — |
| PG/NPG/ISO/Man (62% N.V.) | 21.1 | — | — | — | — | — | — | — | — |
| PG/Man/ISO (66% N.V.) | — | 75 | 75 | 75 | 75 | 75 | 75 | 75 | 75 |
| Polystyrene (40%) | 23.6 | — | — | — | — | — | — | — | — |
| Urethane adipate | 11 | — | — | — | — | — | — | — | — |
| Modified Pvac (33% N.V.) | — | 15 | 15 | 15 | 15 | 15 | 15 | 15 | 15 |
| Monomer | — | 10 | 10 | 10 | 10 | 10 | 10 | 10 | 10 |
| Di-tertiary-butylhydroxytoluene | 0.05 | 0.1 | 0.1 | — | 0.1 | 0.1 | 0.1 | 0.1 | 0.1 |
| Parabenzoquinone (5%) | — | 0.5 | 0.5 | 0.5 | — | 0.5 | 0.5 | 0.5 | 0.5 |
| Tertary-amyl peroxy-2-ethylhexanoate | 2 | 2 | 2 | — | — | — | — | — | — |
| dibenzoyl peroxide (40%) | — | — | — | 4 | 4 | — | 4 | 4 | 4 |
| di-(4-t-butyl-cyclohexyl) peroxydicarbonate | — | — | 1 | 1 | 1 | 1 | — | 1 | 1 |
| dibenzoyl peroxide | — | — | — | — | — | 1.6 | — | — | — |
| fumed silicia | 0.5 | — | — | — | — | — | — | — | — |
| zince stearate | 6 | 4 | 4 | 4 | 4 | 4 | 4 | 4 | 4 |
| calcium carbonate 5 micron | 100 | 120 | 120 | 120 | 120 | 120 | 120 | 180 | 120 |
| MgO thickener (38%) | 1.06 | 2 | 2 | 2 | 2 | 2 | 2 | 2 | 3.44 |
| 1 inch glass length | 27% | 27% | 27% | 27% | 27% | 27% | 27% | 27% | 27% |
| Viscosity (MMcPs) | | | | | | | | | |
| 1 day | 1.6 | 1.4 | 0.8 | 10.4 | 14.4 | 0.16 | 11.6 | 22.6 | 38.8 |
| 2 day | | | | 13.2 | 15.2 | 2.2 | 11.4 | 26.1 | 53.1 |
| 4 day | | 9.3 | 8 | gel | gel | 10.6 | 11.7 | 27.4 | 72.9 |
| 7 day | 4.6 | 15.4 | 18.4 | | | 26.2 | 14 | 23.8 | 80+ |

TABLE 1-continued

| | Comparative Example No. | | | | | | | | |
|---|---|---|---|---|---|---|---|---|---|
| | 1 | 2 | 3 | 4 | 5 | 6 | 7 | 8 | 9 |
| 14 day | 3.6 | 28 | 42.4 | | | 59.8 | 12.6 | 22 | 80+ |
| Cure time(min) | 10 | 10 | 10 | gel | gel | 10 | 30+ | 10 | 10 |
| Hardness out of mold (HB) | 0 | 0 | 10 | | | 5 | 0 | 5 | 5 |
| Hardness 5 min. Out of mold (HB) | 0 | 0 | 40 | | | 25 | 0 | 25 | 25 |
| Spiral flow(inches) | 35 | 44 | 22.7 | 0 | 0 | 16.3 | 44 | 15.7 | 10.8 |

EXAMPLE 1

A resin composition in accordance with the invention was prepared by mixing 75 phr of unsaturated polyester, 15 phr of a LPA and 10 phr of styrene. To this mixture was added 0.1 phr of BHT, 0.5 phr of a 5%, by weight, parabenzoquinone solution, 4 phr of a 40%, by weight, emulsion of dibenzoyl peroxide, 1 phr of di(4-tert-butyl-cyclol hexyl) peroxydicarbonate, 4 phr of zinc stearate, 120 phr of calcium carbonate (5 micron), 2 phr of magnesium oxide thickener paste, and 27% of fibrous chopped glass having a length of one inch.

This composition had a 1 day thickened viscosity of 10 MMcPs and maintained this viscosity for 14 days. This composition was molded at 88° C. for 10 minutes. The molded part had a hardness of 5 HB and after cooling for 5 minutes had a hardness of 25 HB. The spiral flow measured 28.6 inches when molded at 82° C. with a ram pressure of 300 psi. The results are in Table 2 below.

EXAMPLE 2

The resin composition of Example 1 was prepared except 0.5 phr of fumed silica, (available from Cabot Industries under the trade name CABOSIL PTG). No significant improvement in the spiral flow was observed.

EXAMPLE 3

A resin composition was prepared by mixing 75 phr of unsaturated polyester, 15 phr of LPA and 10 phr of styrene. Added to this mixture was 0.1 phr of BHT, 0.75 phr of a 5%, by weight, solution of parabenzoquinone initiator, 4 phr of a 40%, by weight, emulsion of dibenzoyl peroxide, 1 phr of initiator di(4-tert-butyl-cyclohexyl) peroxydicarbonate, 4 phr of zinc stearate, 120 phr of calcium carbonate, 2 phr of magnesium oxide thickener paste and 27% of fibrous chopped glass having a length of one inch.

This composition had a 1 day thickened viscosity of 10 MMcPs and maintained this viscosity for 14 days. The composition was molded for 10 minutes at 88° C. The molded part had a hardness value of 5 HB and after cooling for 5 minutes was 25 HB. The spiral flow was 30.7 inches.

EXAMPLE 4

A resin composition was prepared by mixing 75 phr of an unsaturated polyester, 15 phr of LPA and 10 phr of styrene. Added to this mixture was 0.5 phr of inhibitor BHT, 0.5 phr of a 5%, by weight, solution of parabenzoquinone initiator, 4 phr of a 40%, by weight, emulsion of dibenzoyl peroxide initiator, 1 phr of initiator di(4-tert-butyl-cyclol hexyl) peroxydicarbonate, 4 phr of zinc stearate, 120 phr of calcium carbonate, 2 phr of magnesium oxide thickener paste and 27% of fibrous chopped glass having a length of one inch.

This composition had a 1 day thickened viscosity of 10 MMcPs and maintained this viscosity for 14 days. The composition was molded at 88° C. for 15 minutes. The molded part had a hardness value of zero but increased to 15 after 5 minutes. The spiral flow was 37.0 inches.

EXAMPLE 5

The resin composition of Example 4 was prepared except 0.75 phr of a 5%, by weight, solution of parabenzoquinone inhibitor was used. The composition exhibited a similar viscosity profile as Example 1. After being molded at 88° C. for 15 minutes, the molded part had a hardness value of zero but increased to 15 after 5 minutes. The spiral flow was 42.7 inches.

MOLDING TRIAL RESULTS

The composition of Example 1 was molded into a 18 inch by 18 inch auto part. The mold was an epoxy RTM mold with no shear edge. The mold had a temperature of about 88° C. and a pressure about 100 psi. The composition flowed and filled out all areas of the tool and the material cured 10 minutes. The material had a Barcol hardness of (10–20 HB) out of the mold. Mechanical properties were tested from these parts, results were comparable to standard SMC formulations.

TABLE 2

| Comparative Example No. | 1 | 2 | 3 | 4 | 5 |
|---|---|---|---|---|---|
| DCPD/Man/PGE (70% N.V.) | — | — | — | — | — |
| PG/NPG/ISO/ Man (62% N.V.) | — | — | — | — | — |
| PG/Man/ISO (66% N.V.) | 75 | 75 | 75 | 75 | 75 |
| Polystyrene | — | — | — | — | — |
| Urethane adipate | — | — | — | — | — |
| Modified Pvac (33% N.V.) | 15 | 15 | 15 | 15 | 15 |
| Monomer | 10 | 10 | 10 | 10 | 10 |
| Di-tertiary-butylhydroxy-toluene | 0.1 | 0.1 | 0.1 | 0.5 | 0.5 |
| Parabenzoquinone (5%) | 0.5 | 0.5 | 0.75 | 0.5 | 0.75 |
| Tertary-amyl peroxy-2-ethylhexanoate | — | — | — | — | — |
| dibenzoyl peroxide (40%) | 4 | 4 | 4 | 4 | 4 |
| di-(4-t-butyl-cyclohexyl) peroxydi-carbonate | 1 | 1 | 1 | 1 | 1 |
| dibenzoyl | — | — | — | — | — |

TABLE 2-continued

| Comparative Example No. | 1 | 2 | 3 | 4 | 5 |
|---|---|---|---|---|---|
| peroxide | | | | | |
| fumed silicia | | 0.5 | — | — | — |
| zince stearate | 4 | 4 | 4 | 4 | 4 |
| calcium carbonate 5 micron | 120 | 120 | 120 | 120 | 120 |
| MgO thickener (38%) | 2 | 2 | 2 | 2 | 2 |
| 1 inch glass length Viscosity (MMcPs) | 27% | 27% | 27% | 27% | 27% |
| 1 day | 10.2 | 5.6 | 8.7 | 8.4 | 8.4 |
| 2 day | | | 11.2 | 12.4 | 12 |
| 4 day | | 6.6 | 11.6 | 10.4 | 10 |
| 7 day | 9.6 | 6.5 | 9.6 | 8.6 | 9.7 |
| 14 day | 9.6 | 7.5 | 9.6 | 8.00 | 9.4 |
| Cure time(min) | 10 | 10 | 10 | 15 | 15 |
| Hardness out of mold (HB) | 5 | 2 | 0 | 0 | 0 |
| Hardness 5 min. Out of mold (HB) | 25 | 30 | 25 | 15 | 15 |
| Spiral flow (inches) | 28.6 | 27.5 | 30.7 | 37.0 | 42.7 |

The composition of the invention can be used as a sheet molding compound or composition; the acronym SMC is used interchangeably with sheet molding compound herein. An SMC formulation can be molded at a temperature between 65–95° C. and 0.7–3.5 megapascals (Mpa) for 5–20 minutes. Ideally the compound or composition should be molded at 88° C. and 1.4 Mpa for 7 minutes.

Although the present invention has been described with reference to specific details of certain embodiments, it is not intended that such details should be regarded as limitations upon the scope of the invention except to the extent that they are included in the accompanying claims.

What is claimed is:

1. A process for controlling the shelf life of a formulation comprising an unsaturated polyester which can be molded into work parts under molding conditions comprising a temperature between 65–95° C. and at 0.7–3.5 megapascals (Mpa) for 5–20 minutes, during which the polyester is molded and crosslinked, which process further comprises formulating the unsaturated polyester with an initiator and admixing the unsaturated polyester with a combination comprising two reagents, wherein one of said two reagents scavenges free radicals generated at a first temperature between 25 to 50 degrees and a second scavenger which scavenges free radicals at a second temperature which is above said first temperature, and thus reducing the degree of crosslinking, prior to said molding conditions, wherein the two reagents comprise parabenzoquinone in combination with di-tertiary-butylhydroxytoluene.

2. The process of claim 1, wherein said initiator is dibenzoyl peroxide.

3. The process of claim 1 wherein said initiator comprises dibenzoyl peroxide solution in combination with di-(4-t-butyl-cyclohexyl)peroxydicarbonate.

4. The process of claim 3, wherein the dibenzoyl peroxide is in the form of a solution.

5. The process of claim 1, wherein the unsaturated polyester is formulated with two initiators.

6. The process of claim 1, wherein the unsaturated polyester comprises 1.60 moles propylene glycol, 1.00 moles maleic anhydride and 0.50 moles isophthalic acid.

7. An unsaturated polyester formulation, with an improved shelf life comprising the reaction product of a diol or polyol and maleic anhydride alone or in combination with isophthalic acid, dicyclopentadiene and admixtures thereof, in combination with two reagents, wherein one of said two reagents scavenges free radicals generated at a first temperature between 25 to 50 degrees and a second scavenger which scavenges free radicals at a second temperature which is above said first temperature, wherein said two reagents are present together in an amount which is effective to reducing degree of crosslinking occurring at ambient temperature, prior to molding the formulation, wherein the two reagents comprise parabenzoquinone in combination with di-tertiary-butylhydroxytoluene.

8. The process of claim 7, wherein said initiator is dibelizoyl peroxide.

9. The process of claim 7, wherein said initiator comprises dibenzoyl peroxide solution in combination with di-(4-t-butyl-cyclohexyl)peroxydicarbonate.

10. The process of claim 7, wherein the dibenzoyl peroxide is in the form of a solution.

* * * * *